UNITED STATES PATENT OFFICE.

EDWARD HARDCASTLE, OF STOCKPORT, ENGLAND.

COMPOUND WHICH FORMS AN EMULSION WITH WATER TO BE APPLIED TO THE SURFACES OF ROADS OR OTHER PLACES.

No. 819,012.　　　　Specification of Letters Patent.　　　Patented April 24, 1906.

Application filed January 2, 1906. Serial No. 294,121.

*To all whom it may concern:*

Be it known that I, EDWARD HARDCASTLE, a subject of the King of Great Britain, residing at St. Petersgate Mills, Stockport, England, have invented a new and useful compound which forms an emulsion with water to be applied to the surfaces of roads or other places for the purpose of preventing the formation of dust and of allaying it, (for which I have obtained a patent in Great Britain, No. 14,239, dated July 11, 1905,) of which the following is a specification.

The formation of dust on the surfaces of roads is well known to be a nuisance and a danger to the health of the community.

My invention has for its object the manufacture of a fluid by which pitch or asphaltum can be brought into mixture with water, so as to enable it or them to be sprinkled or spread over such roads to prevent the dust forming or arising. This is accomplished by the pitch or asphaltum being left on the road-surface agglutinating the particles when the water has evaporated therefrom. All roads, especially those paved with wood, are resting-places for those disease germs which arise from animal-droppings. The aseptic properties of this preparation have a remedial action thereon.

My said compound consists of the following:

I take of—

1. (*a*) Coal-tar creosote, fifty gallons; (*b*) coal-tar pitch, one hundredweight; (*c*) resin, two hundredweight, one gram, 0 pounds. These I mix together and melt by heat until solution is effected.

I also take of—

2. Caustic soda or caustic potash, twenty-eight pounds, and dissolve it in eighteen gallons of water.

The above proportions, however, may be varied according to circumstances.

I then pour the latter solution (2) into the former mixture (1) and agitate until the whole is completely combined. This improved compound forms an emulsion when mixed with water so as to deposit the pitch or asphaltum upon the road-surface.

What I claim, and desire to secure by Letters Patent of the United States, is—

The herein-described compound consisting of coal-tar creosote and resinate of soda holding pitch or asphaltum in solution which forms an emulsion with water, for the purpose of preventing the formation of dust and allaying it.

EDWARD HARDCASTLE.

Witnesses:
　GEO. A. DOWNS,
　MARGARET STAFFORD.